April 17, 1956 — J. C. DUDDY — 2,742,521

STORAGE BATTERY SEPARATOR

Filed Dec. 21, 1951

INVENTOR
JOSEPH C. DUDDY

BY
ATTORNEY

United States Patent Office 2,742,521
Patented Apr. 17, 1956

2,742,521

STORAGE BATTERY SEPARATOR

Joseph C. Duddy, Langhorne, Pa.

Application December 21, 1951, Serial No. 262,723

2 Claims. (Cl. 136—145)

The invention relates to storage batteries and, more particularly to separators or diaphragms adapted for use between the positive and negative plates thereof.

Thin microporous diaphragms made of electrically non-conducting material are inserted into storage batteries between plates of opposite polarity to prevent metallic contact therebetween while permitting ionic transfer through the pores, the latter being of such small dimensions as to prevent passage of metallic particles, colloidal in size. The optimum diaphragm is, therefore, one that has maximum porosity compatible with the requisite pore size and mechanical strength, such feature being necessary not only to maintain the necessary insulation between the positive and negative plates in spite of growth or "treeing" of active material but also to withstand rough treatment during assembly operations and to facilitate insertion between the plates.

It has heretofore been common practice to use separators of microporous materials formed into a sheet or plate having one flat, smooth side and a plurality of raised ribs, either hollow or solid, upon the other side. Conventionally, these separators have been used in the battery with the ribs adjacent the positive plate to permit access to the positive active material of an adequate supply of electrolyte. To provide adequate mechanical strength, these separators have also been formed with a rib along each vertical edge thereof having a width greatly enlarged over those spaced across the remainder of the separator face. These enlarged ribs, however, have resulted in the loss of electrolyte space thereby reducing the amount of electrolyte present in the cell, a feature of prime importance particularly in batteries of modern design.

Additionally, there is always present in storage batteries particularly those in which the plates and separators are tightly packed, the problem of permitting the escape of those gases that are evolved during the charging process or as a result of local action. If these gases cannot freely vent from the plates there is a tendency for gas pockets to form thereby blocking off or passivating a portion of the plate. In such a situation, the areas so passivated, although receiving the benefit of the initial charging current, will not contribute to the discharge reaction and, therefore, will limit the efficiency of the system in direct proportion to the area of such blocked-off or passivated spots.

Any gases evolved at the positive plate, will of course, escape through the channels between the ribs on that side of the separator. It has been found, however, that the flat negative side of the separator, when wetted by electrolyte, tends to cling to the active material of the negative plate and thereby block the escape of gas evolved from that plate.

In United States Patent No. 2,542,527, issued February 20, 1951, there is disclosed a method of making microporous separators by mixing a thermoplastic resin and particles of starch. The mix is formed into a desired shape, as by extrusion, and treated with hot water to swell the starch particles. While in the swollen state the starch is leached out, preferably by treatment with hot acid, and the shaped mass then shrinks to approximately its original dimensions, following which it is washed to remove the acid, and dried.

The diaphragm of the present invention can advantageously be produced by use of the above set forth process. It has been found, however, that for reasons of economy, the treating time i. e., the period necessary for the removal of starch by the hot acid, must be held to a minimum and should be uniform for all parts of the separator otherwise deformation may occur.

It will be seen that the diaphragm of the present invention is characterized by features that provide the requisite mechanical strength without loss of electrolyte space, that provide a uniform cross-sectional area throughout, and that prevent passivation of the negative plate by evolved gases. Additional features will become apparent from the description and claims that follow.

Referring to the drawing in which like numerals are used to designate like features, Figure 1 is an elevational view of one face of the diaphragm that is the subject of my invention.

Figure 1:
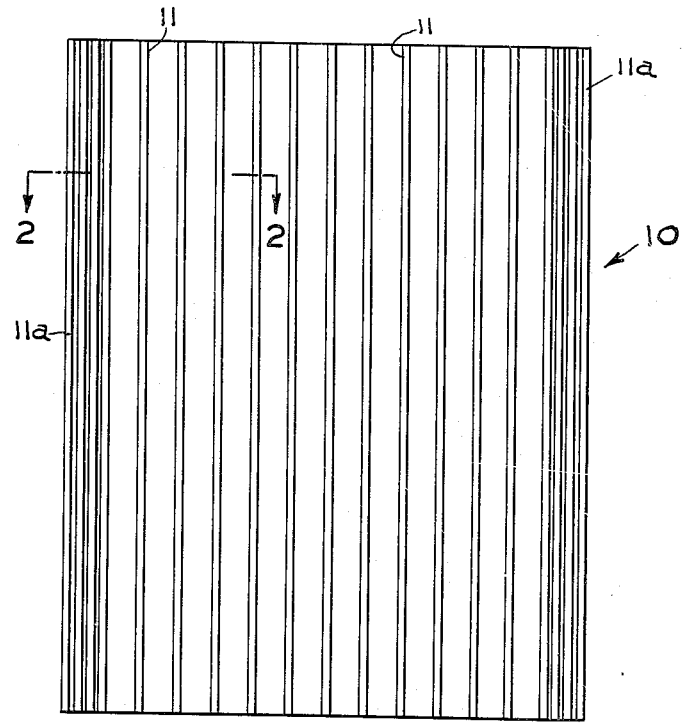

In the drawing, the numeral 10 indicates generally a diaphragm made in accordance with my invention. One face of the diaphragm is provided with a plurality of raised, solid ribs 11 extending vertically for the entire length of the diaphragm. Ribs 11 are shown as spaced across approximately 90% of the lateral dimension of the diaphragm. Parallel to each vertical edge and extending inwardly therefrom for a distance of approximately 5% of the total width of the diaphragm are provided a plurality of ribs 11a similar to ribs 11 in all respects save that the latter are spaced approximately three times the distance apart compared with the spacing between ribs 11a.

It should be noted that ribs 11 and 11a are so dimensioned that the width thereof is substantially equal to the thickness of the web 12 of the diaphragm so as to provide a constant cross-section throughout the separator.

Figure 2:
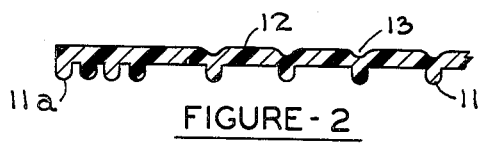
Figure 2 is an enlarged sectional view taken along the line 2—2 of Figure 1.
Figure 3:
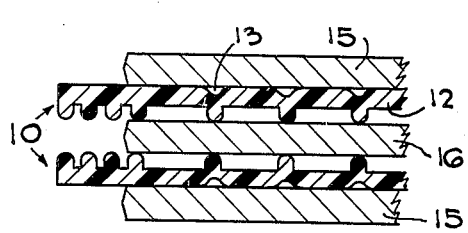
Figure 3 is a top plan view showing the diaphragm in position between a pair of positive and negative storage battery plates.

On the reverse side of the separator and located directly opposite ribs 11 are a plurality of continuous gas escape channels 13. These channels can either be grooves as shown in Figures 2 and 3, triangularly shaped grooves as shown at 14 in Figure 4, or any other shape in which the lateral dimension of the channel inwardly of the diaphragm is less than the lateral dimension at the face of the separator. It will be understood that this feature of gas escape channels is useful in either the ribbed or flat type of diaphragm. In any event if ribbed, the preferred distribution of such channels is one channel directly opposite each rib, such arrangement tending to carry out the concept of constant cross-sectional area.

Figure 4:
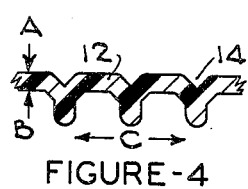
Figure 4 is an enlarged plan view of a portion of the diaphragm showing a modified design thereof.

The triangularly shaped channel shown at 14 in Figure 4 is particularly effective for the proposed purpose in that not only it provides for escape of the gas from the negative plate 15 (Figure 3) but due to its peculiar shape tends to resist collapse of the separator under pressure applied by the expansion of the negative active material.

It will be understood that pressure applied by expansion of the active material of either negative plate 15 or positive plate 16 will be normal to ribs 11 in the direction indicated by arrows A and B (Figure 4). This force is then resolved into a movement of the diaphragm in the plane indicated by arrows C (Figure 4). In view of this it has been found desirable to devise a gas escape means that will permit escape of gases evolved at the negative plate for as long a period of time as possible, that will not permit undue negative expansion, and that will not tend to permit the diaphragm readily to collapse under pressure. The design shown in Figure 4 is particularly adapted to achieve this.

The depth of the gas escape channel represents the critical dimension insofar as ease of gas escape is concerned. It will be understood that only by the use of a triangularly shaped channel, such as 14, can this dimension be increased to the maximum or optimum and yet maintain the minimum cross-sectional area into which the negative active material can expand. When the battery is new, and the maximum need for gas venting is present, channels 14 are, of course, entirely open since expansion of the negative is not yet a factor. Upon expansion of the negative into the channels, although pressure will be applied in the direction of arrows C against the walls of channels 14, this will tend to be limited by force in the direction of arrow A preventing collapse of the diaphragm in the direction of arrow B. The width of the base of channel 14 being less than the width of ribs 11 additional support is given by the portion of the separator underlying the ribs.

It will be seen, therefore, that there has been devised a microporous diaphragm of adequate mechanical strength without loss of electrolyte space, having gas escape means to prevent passivation of the negative plate, such gas escape means being designed to prevent collapse of the diaphragm under pressures applied by the expansion of active material during the life of the battery.

The examples hereinbefore given and the descriptions set forth are indicative of how the invention may be applied. Other forms and variations coming within the scope of the appended claims will be apparent to those skilled in the art.

I claim:

1. A microporous storage battery separator comprising a web having a plurality of spaced solid vertical ribs projecting from one face thereof and adapted to bear upon a positive plate of said battery, the ribs extending continuously for the length of said separator and having a cross sectional area substantially identical with the thickness of the web of said separator, the ribs adjacent the vertical edges of said separator being more closely spaced than those remote therefrom, and continuous substantially triangularly shaped gas escape channels formed in the opposite face of said web adjacent a negative plate, the width of said channels being less than the width of said ribs and each channel being formed directly opposite each of said more widely spaced ribs.

2. The separator of claim 1 in which the ribs adjacent the vertical edges thereof are spaced approximately one third the distance apart of those more remote therefrom.

References Cited in the file of this patent

UNITED STATES PATENTS

| | | |
|---|---|---|
| 1,399,531 | Walter | Dec. 6, 1921 |
| 1,492,260 | Norris | Apr. 29, 1924 |
| 2,066,939 | Kershaw | Jan. 5, 1936 |
| 2,120,120 | Wells | June 7, 1938 |
| 2,382,829 | Strickhouser et al. | Aug. 14, 1945 |
| 2,465,493 | Strickhouser et al. | Mar. 29, 1949 |
| 2,579,589 | Lehmberg | Dec. 25, 1951 |
| 2,591,754 | Wilson et al. | Apr. 8, 1952 |
| 2,602,843 | Brennan | July 8, 1952 |

FOREIGN PATENTS

| | | |
|---|---|---|
| 992,683 | France | Oct. 22, 1951 |